United States Patent
Miller

(12) United States Patent
(10) Patent No.: US 9,476,206 B2
(45) Date of Patent: Oct. 25, 2016

(54) WALLBOARD JOINT TAPE HAVING DIRECTIONAL INDICATORS

(71) Applicant: United States Gypsum Company, Chicago, IL (US)

(72) Inventor: Charles J. Miller, Johnsburg, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 35 days.

(21) Appl. No.: 14/049,720

(22) Filed: Oct. 9, 2013

(65) Prior Publication Data

US 2015/0096252 A1    Apr. 9, 2015

(51) Int. Cl.
| | | |
|---|---|---|
| E04F 13/04 | (2006.01) |
| B32B 38/00 | (2006.01) |
| E04F 19/02 | (2006.01) |
| E04F 21/165 | (2006.01) |
| E04F 19/04 | (2006.01) |
| E04F 13/08 | (2006.01) |

(52) U.S. Cl.
CPC ........... *E04F 13/042* (2013.01); *B32B 38/145* (2013.01); *E04F 19/022* (2013.01); *E04F 21/165* (2013.01); *E04F 13/0887* (2013.01); *E04F 2019/0454* (2013.01)

(58) Field of Classification Search
CPC ............. E04F 13/042; E04F 13/0887; E04F 2019/0454
See application file for complete search history.

(56) References Cited

U.S. PATENT DOCUMENTS

| | | | |
|---|---|---|---|
| 1,426,569 A | 8/1922 | Ingram | |
| 2,303,144 A * | 11/1942 | Stephenson | A61F 13/02 206/411 |
| 2,814,080 A | 11/1957 | Tvorik et al. | |
| 4,901,663 A * | 2/1990 | De Luca | A47K 10/16 116/200 |
| 5,037,686 A | 8/1991 | Conboy | |
| 5,153,043 A * | 10/1992 | Wang | 428/42.3 |
| 5,418,027 A | 5/1995 | Conboy | |
| 5,486,394 A * | 1/1996 | Stough | 428/61 |
| 5,567,514 A * | 10/1996 | Gold | 428/350 |
| 5,711,124 A | 1/1998 | Stough et al. | |
| 5,799,577 A * | 9/1998 | Takahashi | B41C 1/14 101/114 |
| 6,257,410 B1 * | 7/2001 | Ulmann et al. | 206/389 |
| 2001/0022035 A1 * | 9/2001 | Veloce | G01B 3/02 33/758 |
| 2005/0223581 A1 * | 10/2005 | Hale | G01B 3/02 33/758 |

(Continued)

FOREIGN PATENT DOCUMENTS

CA    2400250 A1    3/2004

OTHER PUBLICATIONS

International Search Report for PCT/US2014/059389 dated Jan. 7, 2015.

*Primary Examiner* — Scott R Walshon
(74) *Attorney, Agent, or Firm* — Greer, Burns & Crain, Ltd.; Pradip Sahu; Philip T. Petti

(57) ABSTRACT

A wallboard joint tape designed to cover a seam joint defined by joining adjacent sheets of wallboard includes an elongate length of tape being supplied as a rolled strip having a first side edge and a second side edge wrapped around a center member having a central opening. The strip has an upper side and an opposite lower side. A lengthwise crease is provided along a centered longitudinal line of the lower side. A plurality of indicators is provided for marking at least one side edge of the tape for enhancing a proper orientation of the tape. The proper orientation of the tape is determined based on a location of the indicators upon the tape.

4 Claims, 3 Drawing Sheets

(56) References Cited

U.S. PATENT DOCUMENTS

| | | |
|---|---|---|
| 2010/0170616 A1 | 7/2010 | Boss et al. |
| 2010/0266803 A1 | 10/2010 | Conboy |
| 2013/0189500 A1 | 7/2013 | Adams |
| 2014/0109425 A1* | 4/2014 | Brotman ............... G01B 3/10 33/759 |

\* cited by examiner

WALLBOARD JOINT TAPE HAVING DIRECTIONAL INDICATORS

BACKGROUND

The present disclosure generally relates to plaster tapes, and more particularly relates to a wallboard joint tape having application facilitating indicators.

A conventional wallboard joint tape is used to cover a seam joint defined by joining two adjacent sheets of wallboard during construction. A smooth outer surface of the seam joint is achieved by applying the wallboard tape over the joint, and is subsequently coated with a joint compound, also referred to as mud. Initially, a small amount of joint compound is spread into the seam joint or gap using a putty knife or trowel. Once the compound is applied to the seam joint, the putty knife is used to smooth the compound so that the compound surface is leveled with a surrounding wall surface. Next, the wallboard tape is applied to the joint, and gently pressed until the tape adheres to the wallboard. Additional layers of the joint compound are applied on top of the tape to cover and hide the joint, and also to create a physical bond between the adjacent sheets of wallboard.

Although a fiberglass mesh wallboard tape can be used, the wallboard tape is typically made of paper, and has a smooth side and a roughened side. The roughened side faces the wallboard, and knits better with the joint compound placed in the seam joint. A lengthwise crease is also provided along a centered longitudinal line of the roughened side to facilitate making corner joints. The smooth side has acceptable bonding properties with cover layers of joint compound used to finish the joint. For better attachment, the tape should be positioned with the crease facing downwardly when applying the tape on the joint so that the roughened side faces and knits with the joint compound.

In many cases, however, the crease alone is not enough to alert users of a proper orientation of the tape, and the users mistakenly use the tape upside down, having the smooth side facing downwardly instead of the roughened side. Due to its even surface, the smooth side does not knit as well with the joint compound as the roughened side. Further, low and poor adhesion to the joint compound occurs when the tape is positioned with the crease facing upwardly. Mistakenly positioned tapes must be removed and reapplied correctly, causing waste of time and materials. While the conventional tapes are functional and partly effective, they present problems for the users when misapplied. Therefore, there is a need for an improved joint tape having an indicator alerting the users of a proper orientation of the tape to save operating time and costs.

SUMMARY

The present disclosure is directed to a wallboard joint tape having directional indicators. One or more indicators marking or coloring one side edge of the joint tape enhance a proper orientation of the tape when embedded into the joint compound. In a plan view, the indicators easily confirm that the tape is correctly embedded and applied to the seam joint without having to verify an orientation of a crease disposed on the tape. By skipping this verification process, installation time is reduced, and thus a faster wallboard installation is achieved. Another aspect of the present tape is that, due to an easier and simpler identification of the indicator than that of the crease orientation, a mistake rate of the user is lowered, and a corresponding waste of material and time are also decreased.

In one embodiment, a wallboard joint tape designed to cover a seam joint defined by joining adjacent sheets of wallboard includes an elongate length of tape being supplied as a rolled strip having a first side edge and a second side edge wrapped around a center member having a central opening. The strip has an upper side and an opposite lower side. A lengthwise crease is provided along a centered longitudinal line of the lower side. A plurality of indicators is provided for marking at least one side edge of the tape for enhancing a proper orientation of the tape. The proper orientation of the tape is determined based on a location of the indicators upon the tape.

In another embodiment, a wallboard joint tape designed to cover a seam joint defined by joining adjacent sheets of wallboard includes an elongate length of tape being supplied as a rolled strip having a first side edge and a second side edge wrapped around a center member having a central opening. The strip has a roughened side and an opposite smooth side. A lengthwise crease is provided along a centered longitudinal line of the roughened side. A plurality of indicators is provided for marking at least one side edge of the tape for informing a user of a proper orientation of the tape. The proper orientation of the tape is determined based on a color of the indicators upon the strip, where the color is visible when viewed from above.

In yet another embodiment, a method of covering a seam joint defined by joining adjacent sheets of wallboard is provided including supplying an elongate length of tape as a rolled strip having a first side edge and a second side edge wrapped around a center member having a central opening. Further included are providing an upper side and an opposite lower side for the strip, providing a lengthwise crease along a centered longitudinal line of the lower side, marking at least one side edge of the tape with a plurality of indicators for enhancing a proper orientation of the tape, and determining the proper orientation of the tape based on a location of the indicators upon the tape.

DETAILED DESCRIPTION

Figure 1:
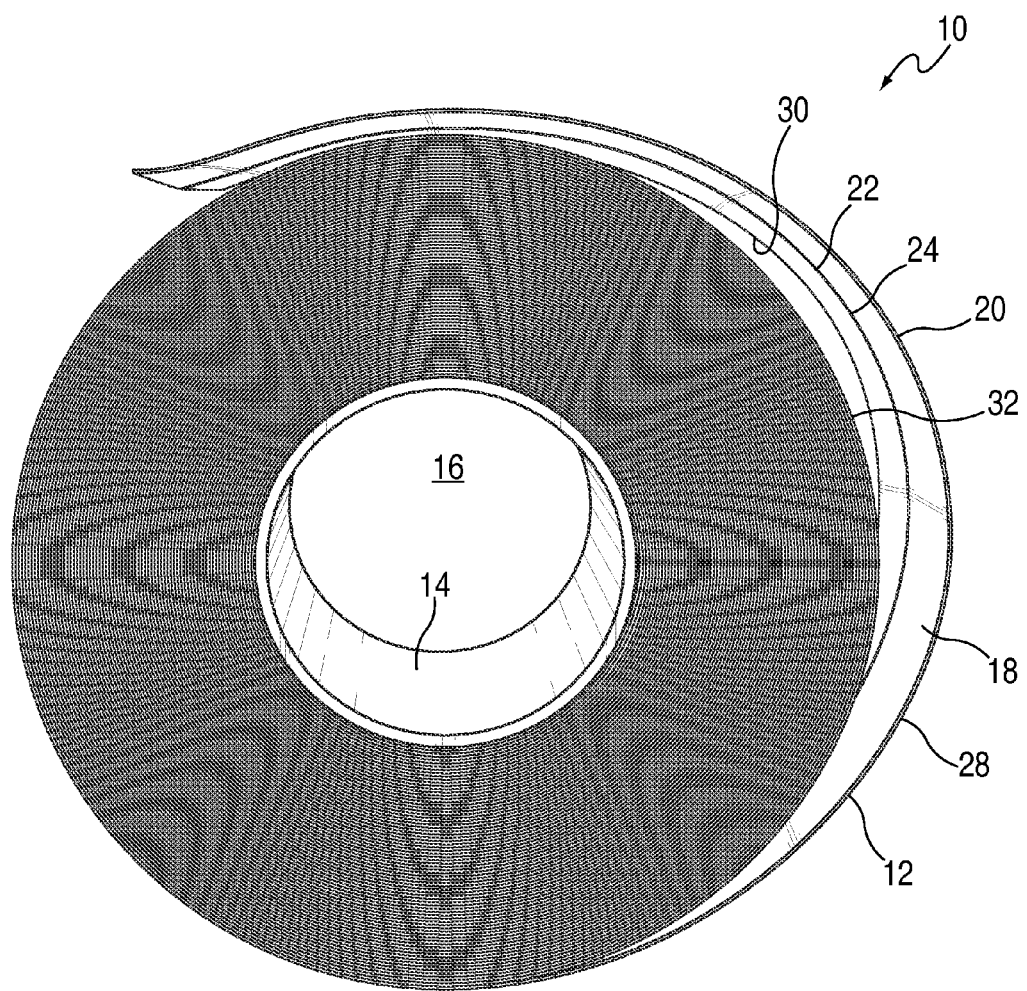
FIG. 1 is a right perspective view of the present wallboard joint tape supplied as a rolled strip depicting one side without indicators.
Figure 2:
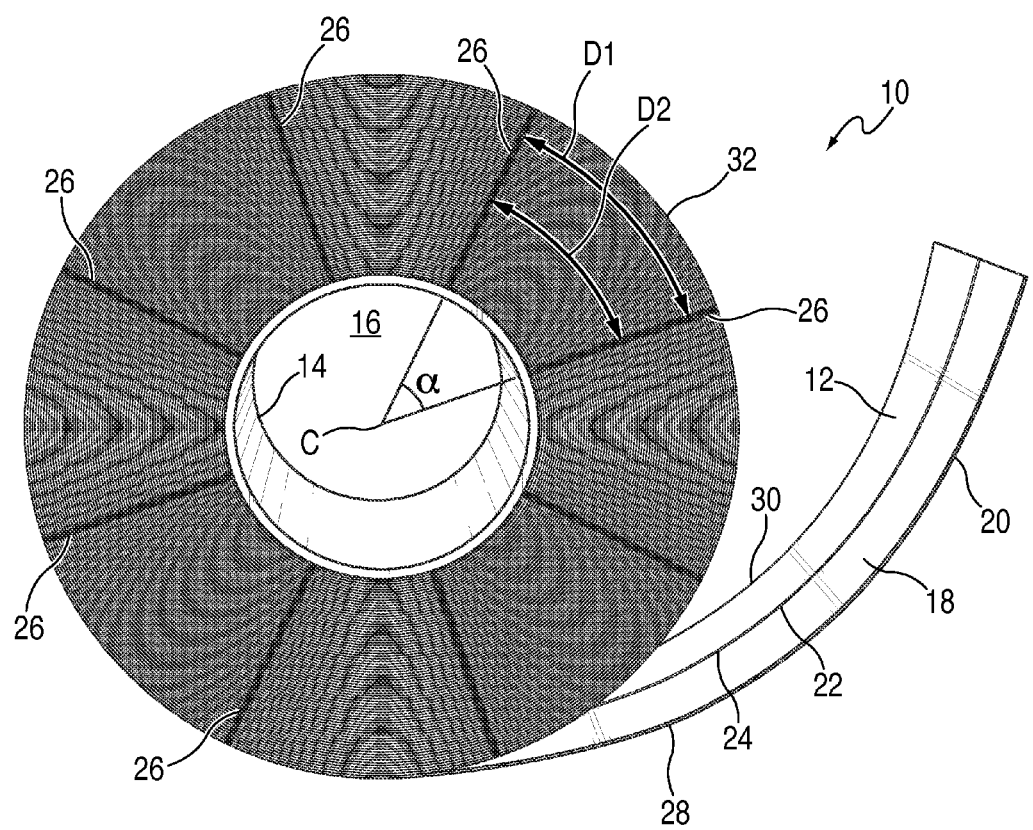
FIG. 2 is a right perspective view of the tape of FIG. 1, featuring exemplary indicators extending radially and generally outwardly from a center member.

Referring now to FIGS. 1 and 2, an exemplary wallboard joint tape or tape roll is generally designated 10, and is designed to cover a seam joint defined by joining two adjacent sheets of wallboard during construction. Typically, the tape or tape roll 10 is directionally mounted to an automatic taper machine (not shown), also known as a wallboard taping bazooka, such that the taper applies a metered amount of joint compound to the tape, applies the tape to the joint, and cuts the tape to a desired length. It is preferred that the wallboard joint tape 10 is supplied as a rolled strip 12 wrapped around a center member or core 14, preferably in a cylindrical shape, having a central opening 16.

Figure 3:
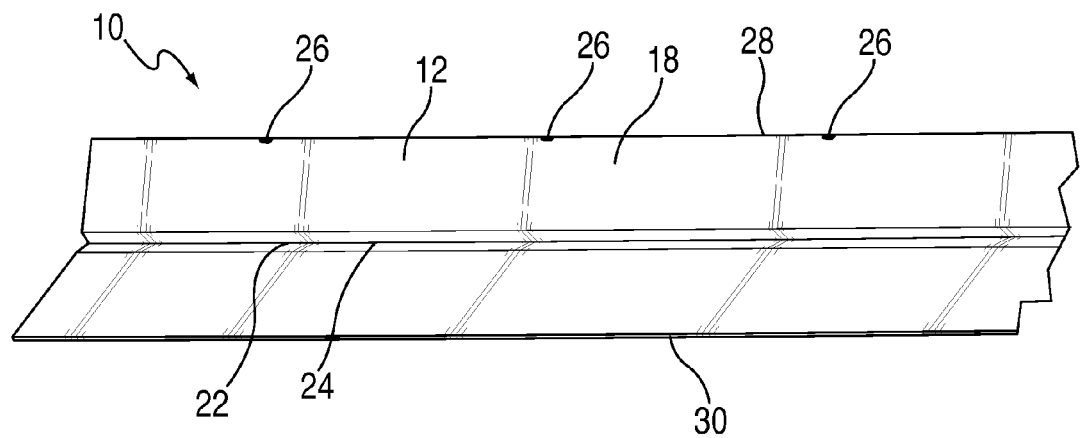
FIG. 3 is a plan view of the present wallboard joint tape having a crease facing downwardly.
Figure 4:
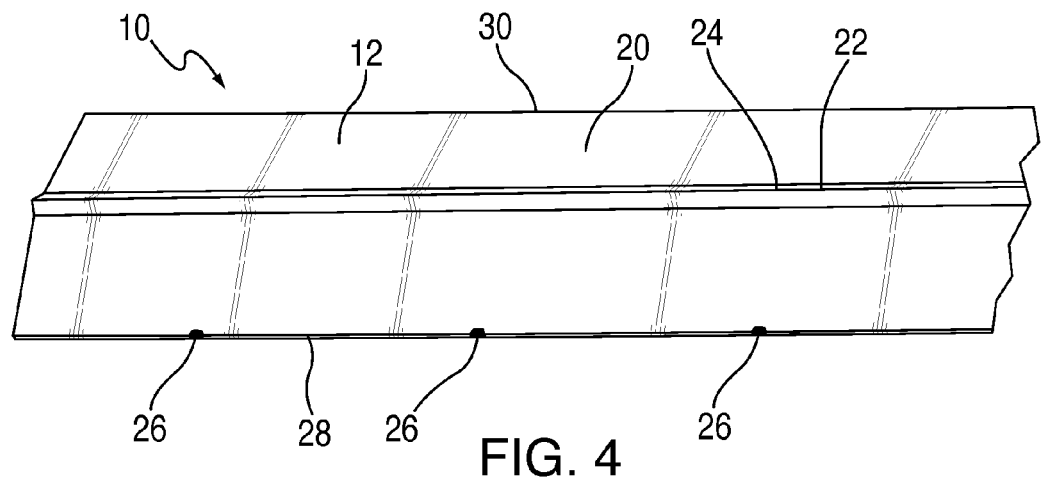
FIG. 4 is a bottom view of the tape of FIG. 3.

Referring now to FIGS. 3 and 4, included in the strip 12 are an upper or smooth side 18 (FIG. 3), and an opposite lower or roughened side 20 (FIG. 4). Along a centered longitudinal line 22 of the lower side 20 is a lengthwise crease or fold line 24 to facilitate bending when reinforcing wallboard joints. As a result of having the crease 24 on the lower side 20, the upper side 18 is slightly folded inwardly. As discussed above, the strip 12 is positioned with the crease 24 facing downwardly toward the joint for facilitating better attachment of the strip 12 to the joint, and for facilitating taping of wallboard corners.

Referring now to FIGS. 1-4, an important aspect of the present tape 10 is that one or more indicators 26 are provided on at least one side edge, namely a right or left side edge 28, 30 of the strip 12, such that a correct orientation is indicated with a color. In a preferred embodiment, the tape 10 is made of paper, and thus the color of the indicators 26 can be absorbed or bled into one of the side edges 28, 30 of the strip 12 to be visible when viewed from above (FIGS. 3 and 4). As such, the correct orientation of the strip 12 is determined based on a location of the indicators 26 upon the tape 10. Although a flexible paper tape is shown for illustration purposes, other types of wallboard tapes, such as a fiberglass mesh tape or a metal tape, can also have similar indicators.

While the right side edge 28 of the strip 12 is shown with the indicators 26 for illustration purposes, it is also contemplated that either the right or left side edge 28, 30 of the tape 10 can be selected for providing the indicators. It is also contemplated that, in another embodiment, the indicators 26 may be disposed on at least one of the upper and lower sides 18, 20 of the strip 12. For example, a selected upper or lower side 18, 20 of the strip 12 has a burned, embossed, or scored mark for indicating the proper orientation of the tape 10 during use.

It is preferred that one or more spaced indicators 26 extend radially and generally linearly outwardly from the center core 14 to an outer or peripheral edge 32 of the tape roll 10, resembling a bicycle wheel spoke arrangement. Although linear, spoke-shaped indicators 26 are shown for illustration purposes, other types of geometric shapes are also contemplated, such as dots, dotted lines, rectangles in a running bond pattern, or any other suitable markings. In another embodiment, at least one of the indicators 26 selectively marks one entire side edge 28, 30 of the strip 12 for indicating the proper orientation of the tape 10.

In a preferred embodiment, the indicators 26 are substantially evenly spaced apart from each other in a predetermined angular relation along the peripheral edge 32 of the tape roll 10. More specifically, spacing between two adjacent indicators 26 is determined based on a predetermined angle α defined by the adjacent indicators. The angle α is measured from a center C of the central opening 16 relative to the peripheral edge 32, and represents space between the adjacent indicators 26. A degree of the angle α is variable to suit the situation. It is preferred that the spacing is close and tight enough to be visible within a selectively cut segment of the strip 12. Thus, depending on a length of the spacing, in the case of shorter strips 12, the selected strip segment may not have the indicators 26 shown on the side edge 28, 30 unless the entire side edge 28, 30 of the tape 10 is marked by the indicators 26.

Corresponding to the geometry of the indicators 26, the spacing between the adjacent indicators is gradually reduced as the strip 12 is rolled out of the center member 14. For example, a first distance D1 between the adjacent indicators 26 may initially be approximately 4 inches near the peripheral edge 32 of the tape roll 10, but as the strip 12 is rolled out of and gradually reaches closer to the center member 14, a second distance D2 between the indicators 26 is reduced to 3 inches. In such manner, the spacing between the adjacent indicators 26 is commensurate with a radial position of the adjacent indicators relative to the center member 14.

Referring now to FIG. 3, the indicators 26 on the right side edge 28 of the tape 10 inform a user of a proper direction of the strip 12 when embedded into a joint compound. More specifically, having the indicators 26 located on the right side of the user when placed in front of the user confirms a proper orientation of the tape 10, and that the roughened side 20 of the strip 12 is positioned with the crease 24 facing downwardly such that the roughened side faces and knits with the joint compound. Without having to verify the orientation of the crease 24 for each use, the strip 12 is quickly laid on the joint for subsequent tasks. Thus, a faster and efficient application of the tape 10 is achieved.

Referring now to FIG. 4, poor adhesion to the joint compound is indicated when the strip 12 is positioned with the crease 24 facing upwardly because the indicators 26 are located on the left side of the user. In this case, a poorly adhered layer of the joint compound residue remains on the upper or smooth side 18 of the strip 12, and the indicators 26 are located on the left side of the user. This confirms an improper application of the joint tape 10.

Although the crease orientation can alert the user of such an improper application of the tape 10, it is difficult to differentiate the upper side 18 from the lower side 20 without the indicators 26. Often, a realization of the improper application comes too late after wasting a fair amount of material and time. In the case of utilizing the wallboard taping bazooka, the user can readily identify the orientation of the tape 10 loaded onto the bazooka, thereby enabling the user to quickly remedy the situation without having to verify the crease orientation. As a result, the quick response from the user not only saves operating time and costs but also reduces associated material waste.

While a particular embodiment of the present wallboard joint tape has been shown and described, it will be appreciated by those skilled in the art that changes and modifications may be made thereto without departing from the present disclosure in its broader aspects and as set forth in the following claims.

The invention claimed is:

1. A method of covering a seam joint defined by joining adjacent sheets of wallboard, comprising:
   supplying an elongate length of wallboard tape as a rolled strip having a first side edge and a second side edge wrapped around a center member having a central opening;
   providing an upper side and an opposite lower side for said strip;
   providing a lengthwise crease along a centered longitudinal line of said lower side;
   marking only a single predetermined side edge of said tape with a plurality of non-regular colored indicators that have a spacing decreasing in length as said tape is unrolled, without running an entire width of said tape for enhancing a proper orientation of said tape, such that a peripheral region of said predetermined side edge, and respective contiguous outer surfaces of said upper side and said opposite lower side of said tape are visibly marked said marking extending an entire height of a roll of said tape, from a center member to a peripheral edge;
   spacing the plurality of non-regular colored indicators by a predetermined angle defined by adjacent non-regular colored indicators;

positioning said crease facing downwardly toward the seam joint for facilitating better attachment of said strip;

placing said lower side of said strip against the seam joint, such that said lower side faces and knits with a joint compound;

locating said plurality of indicators on a predetermined side of a user when placed in front of the user; and displaying said plurality of indicators, constructed and arranged to be visible from a front surface upon placement on the seam joint so as to confirm proper placement of said tape to the user.

2. The method of claim 1, further comprising indicating poor adhesion to the joint compound when said strip is positioned with said crease facing upwardly.

3. The method of claim 1, further comprising locating said indicators on a left side of the user when placed in front of the user, thereby indicating an improper orientation of said tape.

4. The method of claim 1, further comprising locating said indicators on a right side of the user when placed in front of the user, thereby indicating a proper orientation of said tape.

* * * * *